(No Model.)
C. D. HASKINS.
REGULATION OF DYNAMO ELECTRIC MACHINES.
No. 535,797. Patented Mar. 12, 1895.
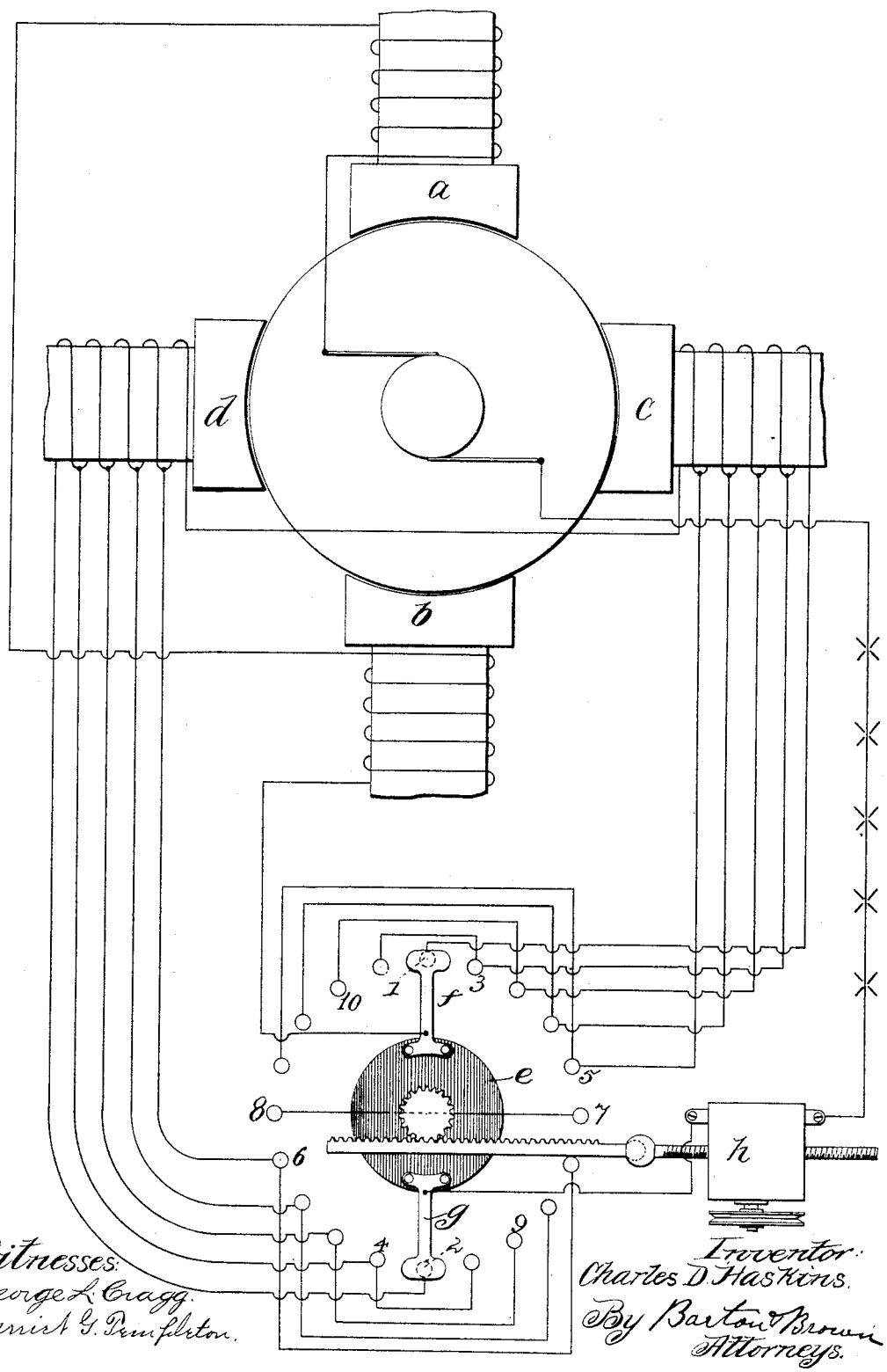

UNITED STATES PATENT OFFICE.

CHARLES D. HASKINS, OF BROOKLYN, NEW YORK, ASSIGNOR TO THE WESTERN ELECTRIC COMPANY, OF CHICAGO, ILLINOIS.

REGULATION OF DYNAMO-ELECTRIC MACHINES.

SPECIFICATION forming part of Letters Patent No. 535,797, dated March 12, 1895.

Application filed August 6, 1894. Serial No. 519,568. (No model.)

*To all whom it may concern:*

Be it known that I, CHARLES D. HASKINS, a citizen of the United States, residing at Brooklyn, in the county of Kings and State of New York, have invented a certain new and useful Improvement in the Regulation of Dynamo-Electric Machines, (Case No. 14,) of which the following is a full, clear, concise, and exact description, reference being had to the accompanying drawing, forming a part of this specification.

My invention relates to those systems of current regulation for dynamo electric machines in which two or more sets of field magnet poles are employed in the machine, one or more of the sets of field magnet poles being maintained at a practically constant magnetic moment, while provision is made for varying the magnetic moment of the other set or sets in accordance with the demand for electrical energy.

In all prior systems of current regulation involving the method of varying the magnetic moment of a portion of the field magnet poles, a rheostat has been employed in connection with the circuit including the coils of the field magnet poles that have been varied. All the coils of the field magnet poles being traversed by the current it has been necessary to vary the magnetic moment of said poles by variation of the current traversing the coils thereof. The rheostat for accomplishing this object is an expensive mechanism, and, moreover, when used, involves a loss of electrical energy. By my invention herein I dispense with the rheostat and the loss in energy resulting, and avoid the loss of energy which is necessarily involved in systems where the rheostat is employed.

Speaking generally, my invention herein consists in a dynamo electric machine having two or more sets of field magnet pole pieces, one of said sets, or a portion of said sets, being combined with switching apparatus, whereby the wire of the coils of said set may be shunted or short-circuited to the extent required, and the direction of the current through said coils reversed in order that the field of force of the machine may be varied in accordance with the load, and the current maintained in the exterior circuit of a practically uniform value.

The switching apparatus which I employ is worked automatically by means of a regulator controlled by variations in the current strength.

In the accompanying drawing, which is illustrative of my invention, I have shown a dynamo electric machine provided with two sets of pole pieces.

The coils of the pole pieces *a b*, constituting the set of pole pieces having a constant magnetic moment, are included directly in the working circuit—that is to say, the current traversing these coils must be of practically constant value. The other set of pole pieces *c d* have their coils connected with the circuit of the machine by means of a switching device consisting of terminal contact points or connections extending to different portions of the said coils of said field magnet poles *c d*. By means of a commutating switch *e* provided with insulated contact arms *f g*, the main current of the machine may be directed through the whole or any portion of the wire of the coils of the field pole pieces *c d*, and the direction of the current through said wire, or any portion of said wire, reversed. The construction of the switching device is also such that all the wire of the coils of said pole pieces *c d* may be cut out or disconnected from the circuit.

When the commutating switch *e* rests, as shown, with contact arm *f* upon the contact terminal 1, and the contact arm *g* upon contact terminal 2, the current will be directed through the entire length of the wire of the coils of magnets *c d*, and both sets of field magnet pole pieces will be acting together to produce a field in which the armature revolving will develop the maximum amount of electromotive force, and thus supply energy to the full load in the exterior circuit.

If lamps are cut out from the exterior circuit the commutator *e* will be shifted by the automatic regulator *h*, first, from contact terminals 1, 2, to contact terminals 3, 4, and thus a portion of the wire of each of the coils of magnets *c d* will be cut out and their magnetic moment diminished accordingly. Upon further reduction of load in the exterior circuit the commutator $e$ will be moved still further until contact arms $f$ and $g$ will be brought into contact with contact terminals 5 and 6, respectively, in which position all but a small portion of the wire of said coils will be shunted. When the load is again still further reduced, the contact arms $f$ $g$ will be brought upon contact terminals 7, 8, respectively, which terminals—7 and 8—are directly connected together, so that all the wire of the two coils of pole pieces $c$ $d$ will be disconnected from the circuit. Further movement of the commutating switch $e$, in response to decrease in load and consequent increase of current, brings contact arms $f$ and $g$ into connection with contact terminals 9 and 10, respectively, and so on until, finally, when the load is removed, contact arm $f$ will rest on contact terminal 2, and contact arm $g$ will rest upon contact terminal 1—that is to say, the current will be directed through all the wire of the coils of pole pieces $c$ $d$ and in the opposite direction to that in which the current had been when the machine was operating under full load. In this manner the excitation of the field pole pieces $c$ $d$ is gradually diminished to zero, and then gradually re-energized, but of opposite polarity. Thus the sets of field magnet pole pieces are caused to act in the same direction, or in the opposite direction, to any degree that may be required in order that the field may be such that the armature will develop such an amount of electromotive force as may be required to supply a current of uniform value to the translating devices placed in the exterior circuit, no matter what the variations may be in the number and resistance of such translating devices.

It is evident that my invention is broadly applicable to any machine having two or more sets of pole pieces, without regard to the particular number of pole pieces which may constitute each set.

The switching device which I have illustrated herein, and the form of the automatic regulator, may be varied in accordance with the preferences of different electrical engineers. I therefore do not limit myself to the details of construction herein illustrated and described.

Having thus described my invention, I claim as new and desire to secure by Letters Patent—

1. The combination with a dynamo electric machine having two sets of field magnet pole pieces and connected with the circuit of the machine, of an automatic switching device adapted to control the amount of wire of the coils of one set that shall be traversed by the current, and to control the direction in which the current shall traverse the wire of said coils, or a portion thereof, substantially as described.

2. The combination with a dynamo electric machine having two sets of field magnet pole pieces and connected with the circuit of the machine, of a switching device adapted to control the amount of wire of the coils of one set that shall be traversed by the current, and to control the direction in which the current shall traverse the wire of said coils, or a portion thereof, substantially as described.

In witness whereof I hereunto subscribe my name this 27th day of July, A. D. 1894.

CHARLES D. HASKINS.

Witnesses:
GEORGE P. BARTON,
HARRIET G. TEMPLETON.